(12) United States Patent
Pazdirek et al.

(10) Patent No.: US 6,505,989 B1
(45) Date of Patent: Jan. 14, 2003

(54) BALL JOINT

(75) Inventors: Jiri Pazdirek, Schaumberg, IL (US); Mikael Herve, Evanston, IL (US)

(73) Assignee: MacLean-Fogg Company, Wheeling, IL (US)

( * ) Notice: Subject to any disclaimer, the term of this patent is extended or adjusted under 35 U.S.C. 154(b) by 77 days.

(21) Appl. No.: 09/784,599

(22) Filed: Feb. 15, 2001

(51) Int. Cl.[7] ................................................ F16C 11/06
(52) U.S. Cl. ...................... 403/135; 403/133; 403/143; 403/122
(58) Field of Search ................................. 403/122, 132, 403/133, 135, 143, 76; 623/22.19

(56) References Cited

U.S. PATENT DOCUMENTS

| | | | |
|---|---|---|---|
| 3,329,454 A | * 7/1967 | Melton et al. | 403/77 |
| 4,116,504 A | 9/1978 | Cass | |
| 4,435,101 A | 3/1984 | Sugiyama et al. | |
| 4,624,674 A | * 11/1986 | Pappas et al. | 623/22.19 |
| 4,679,958 A | 7/1987 | Mizusawa et al. | |
| 5,152,628 A | 10/1992 | Broszat et al. | |
| 5,417,512 A | 5/1995 | Chamberlin | |
| 5,766,260 A | * 6/1998 | Whiteside | 623/22.27 |
| 5,782,573 A | 7/1998 | Dorr et al. | |
| 5,885,022 A | * 3/1999 | Maughan et al. | 403/135 |

FOREIGN PATENT DOCUMENTS

| | | | |
|---|---|---|---|
| DE | 1055973 B1 | * 4/1959 | 403/133 |
| DE | 196 25 351 | 11/1997 | |
| EP | 0 163 296 | 12/1985 | |
| GB | 1 580 182 | 11/1980 | |

OTHER PUBLICATIONS

Drawing No. 1105–022 dated Sep. 9, 1999—MacLean Power Systems.

* cited by examiner

*Primary Examiner*—Lynne H. Browne
*Assistant Examiner*—Ernesto Garcia
(74) *Attorney, Agent, or Firm*—Richard G. Lione; Brinks Hofer Gilson & Lione

(57) ABSTRACT

A ball joint includes a socket that defines an outer surface having multiple, annular, smoothly-curved teeth. A ball is received in the socket, and the socket is received in a recess of a housing. This recess defines complementarily-shaped annular, smoothly-curved teeth. The crests of the teeth are arranged along lines that are angled with respect to the insertion axis such that the teeth of the socket pass over the teeth of the housing without an interference fit therebetween during an early stage of assembly. It is only at the end of assembly that the teeth of the socket mechanically interfere with the teeth of the housing to create the desired snap lock. In one example, the ball joint housing forms a recess that receives a rod. The inner surface of this recess undulates and includes gradually converging surfaces and gradually diverging surfaces with respect to the rod axis. The volume between the housing and the rod is filled with a suitable adhesive such as an epoxy, and the resulting joint effectively resists both compressive and tensile loading.

21 Claims, 4 Drawing Sheets

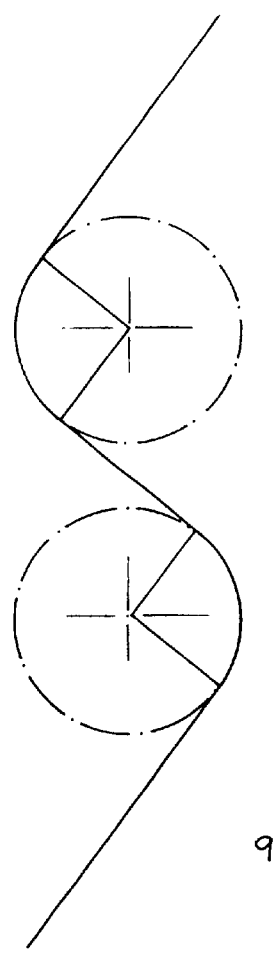
Fig. 7
Fig. 8
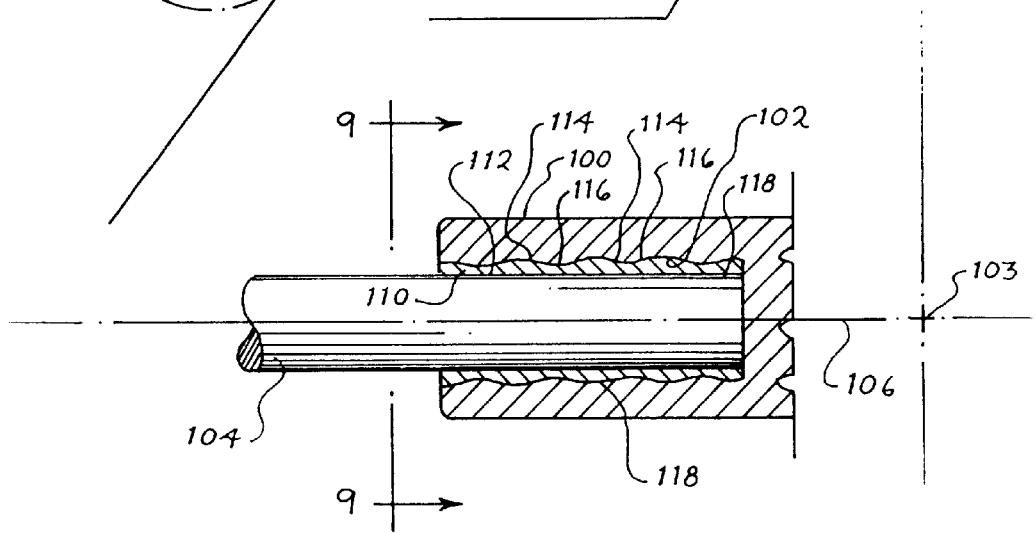
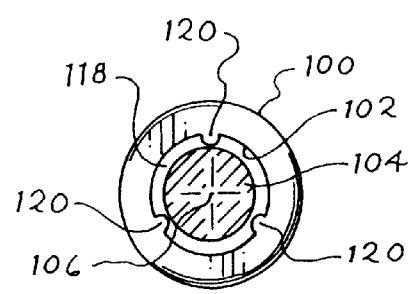
Fig. 9

BALL JOINT

BACKGROUND OF THE INVENTION

The present invention relates to ball joints, such as ball joints used in automotive suspension systems.

There has been considerable activity towards the development of ball joints that are inexpensive, light in weight, and reliable. Sugiyama U.S. Pat. 4,435,101 and Broszak U.S. Pat. No. 5,152,628 disclose ball joints utilizing polymeric housings that are typically injection molded. The following patents disclose various methods for holding a ball joint socket to a ball joint housing, including bonding, threading, and snap-locking: U.S. Pat. No. 5,782,573 (Dorr), U.S. Pat. No. 5,417,512 (Chamberlin), U.S. Pat. No. 4,679,958 (Mizusawa), U.S. Pat. No. 4,116,504 (Cass); DE 196 25 351; EP O 163 296; and GB 1 580 182.

In spite of this earlier work, a need exists for an improved ball joint that secures the socket and the rod to the housing in a simple, high-strength manner.

SUMMARY

The ball joint illustrated in the drawings includes a socket that is snap-locked to a housing by complementary teeth and cavities. The crests of the teeth are smoothly curved with a radius larger than 0.5 millimeter, and the teeth of the housing and the socket are arranged at respective taper angles oriented to facilitate insertion.

The illustrated ball joint is assembled by first inserting the ball into the socket, and then snap-locking the socket into the housing by forcing the teeth of the housing and socket past one another to create the desired engagement. If desired, a suitable adhesive can be used to supplement the mechanical engagement described above.

One of the illustrated ball joints described below includes a recess that defines an undulating surface. The recess receives the rod with the undulating surface facing the rod. The space between the undulating surface and the rod is filled with a suitable adhesive, and the adhesive secures firmly to the rod and reacts against the converging and diverging portions of the undulating surface to resist compressive and tensile loading.

The foregoing paragraphs have been provided by way of introduction, and it is not intended to narrow the scope of the following claims.

BRIEF DESCRIPTION OF THE DRAWINGS

FIG. 7 is a schematic view of an alternative configuration for the teeth and cavities of the socket and housing of FIG. 2.

FIG. 8 is a fragmentary cross-sectional view of portions of the housing and the rod of a second preferred embodiment of this invention.

FIG. 9 is a cross-sectional view taken along line 9—9 of FIG. 8.

DETAILED DESCRIPTION OF THE PRESENTLY PREFERRED EMBODIMENTS

Figure 1:
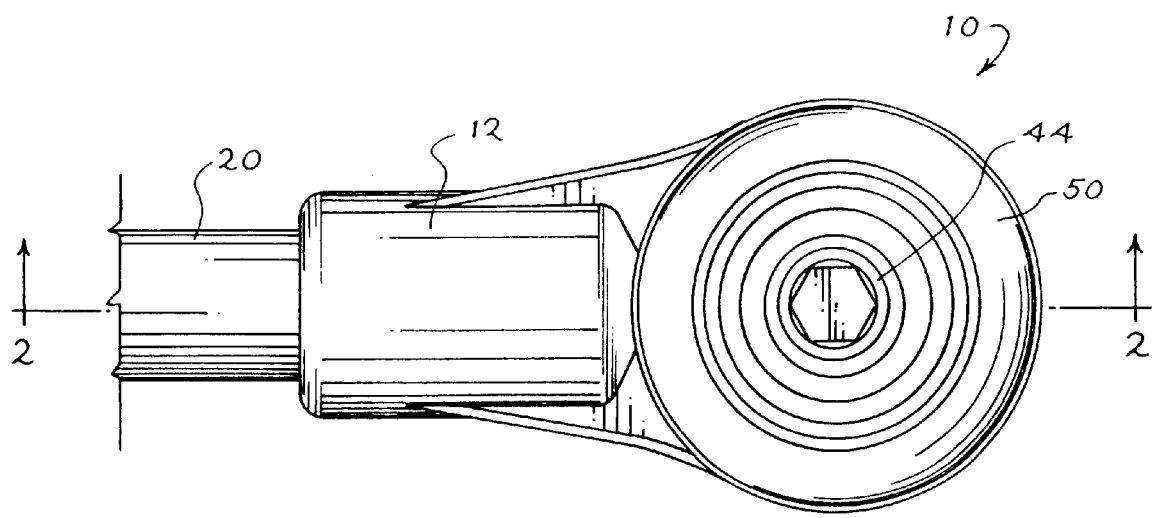
FIG. 1 is a top view of a ball joint that incorporates a preferred embodiment of this invention.
Figure 2:
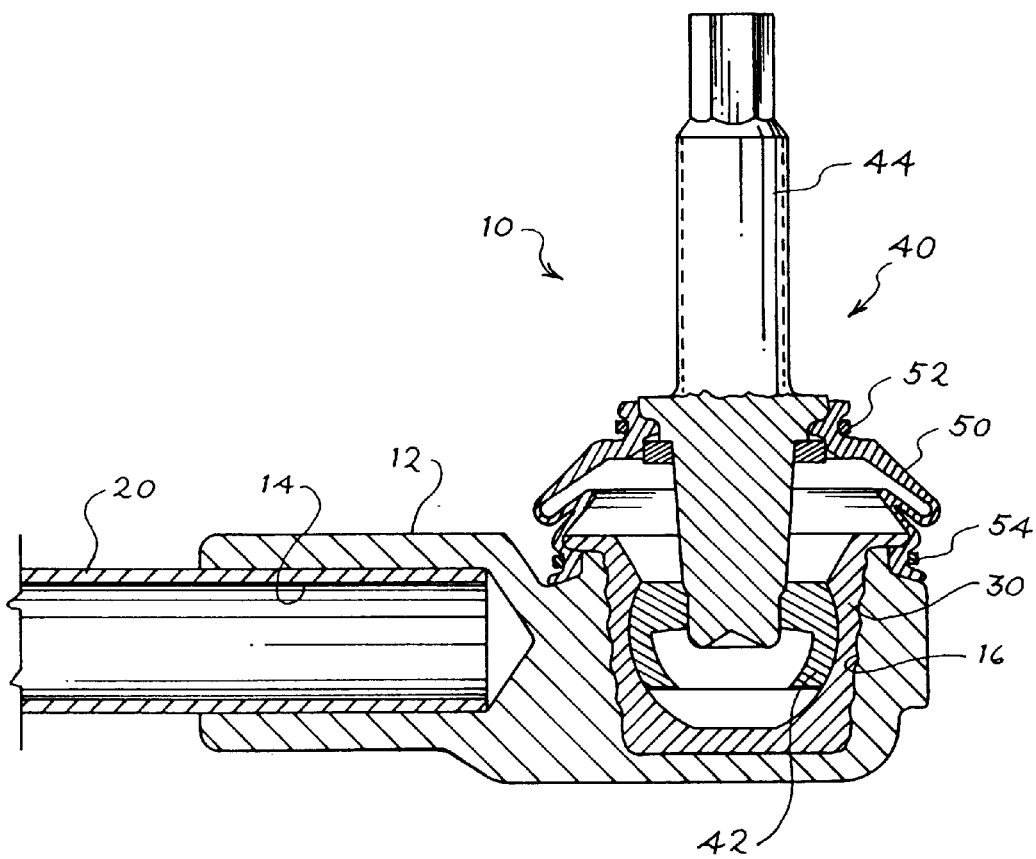
FIG. 2 is a cross-sectional view taken along line 2—2 of FIG. 1.

Turning now to the drawings, FIGS. 1 and 2 provide overall views of a ball joint 10 that incorporates a preferred embodiment of this invention. As best shown in FIG. 2, the ball joint 10 includes a housing 12 that defines first and second recesses 14, 16. The first recess 14 receives a rod 20, and the second recess 16 receives a socket 30. The socket 30 in turn supports a ball stud 40 that includes a ball 42 fixedly mounted to a threaded stem 44. A boot 50 is secured at its upper end to the threaded stem 44 by an upper spring ring 52, and at its lower end to the housing 12 by a lower spring ring 54.

Various elements of the ball joint 10 can be configured in any suitable manner. For example, in some embodiments the ball joint 10 does not include a rod 20. In this case the housing 12 is directly mounted to the support element for the ball joint. In other embodiments, the rod 20 may include another ball joint (not shown) on its opposite end. The ball 42 in many cases defines a partially spherical surface, as shown in FIG. 2, and any suitable technique can be used to join the ball 42 with the threaded stem 44. For example, the ball 42 can be formed in one piece with the threaded stem 44. Similarly, any desired approach can be used for holding the boot in place and for holding the rod 20 in place in the first recess 14. U.S. patent application Ser. No. 09/255,979 filed Feb. 23, 1999 (assigned to the Assignee of the present invention and hereby incorporated by reference in its entirety) discloses preferred arrangements for forming the ball stud 12, for securing the rod 20 to the housing 12, and for securing the boot 50 to the stem 44.

Figure 3:
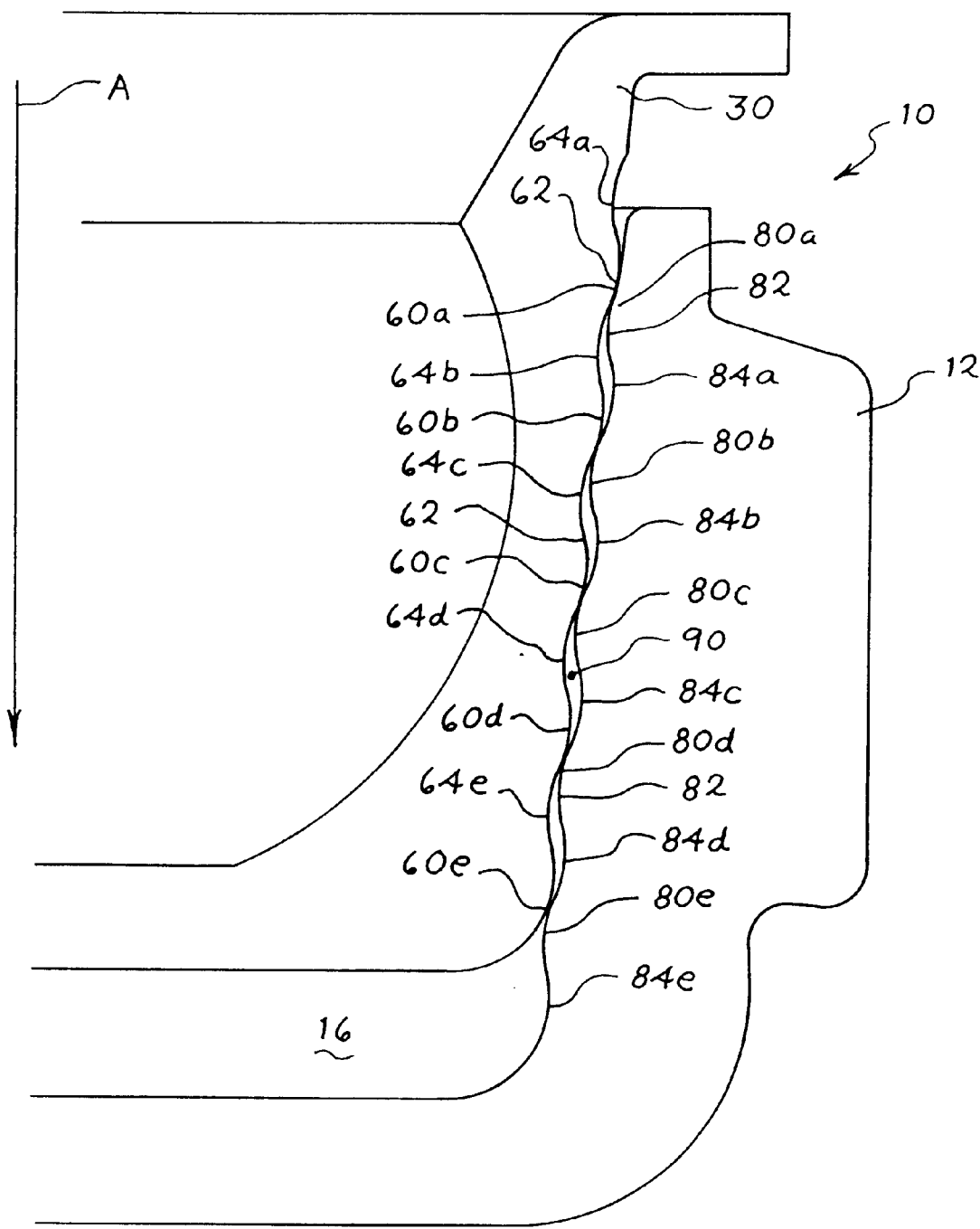
FIG. 3 is an enlarged fragmentary sectional view of portions of the socket and housing of FIG. 2.

As shown generally in FIG. 2 and more specifically in FIG. 3, the socket 30 is securely held in place in the second recess 16 of the housing 12 by a snap-lock engagement of mating teeth and cavities. In FIG. 3, the ball is not shown for clarity of illustration, but the ball 42 is typically positioned inside the socket 30 before the socket 30 is snapped in place in the housing 12.

Figure 5:
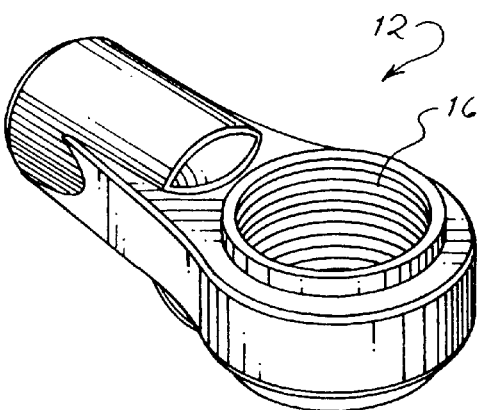
FIG. 5 is a perspective view of the housing of FIG. 2.
Figure 6:
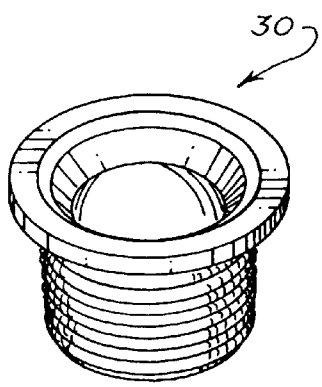
FIG. 6 is a perspective view of the socket of FIG. 2.

Referring to FIG. 3, the socket 30 in this example defines five annular, smoothly curved teeth 60a, 60b, 60c, 60d, 60e. These teeth alternate with annular, smoothly curved cavities 64a, 60b, 64c, 64d, 64e, and together they form an undulating surface. Similarly, the housing 12 and in particular the walls of the second recess 16 define five annular, smoothly curved teeth 80a, 80b, 80c, 80d, 80e alternating with annular, smoothly curved cavities 84a, 84b, 84c, 84d, 84e, which together form an undulating surface. In this example, all of the teeth, all of the cavities, and both of the undulating surfaces are rotationally symmetrical about the insertion axis A, as shown in FIGS. 5 and 6.

The socket 30 is assembled with the housing 12 by motion along the insertion axis A of either the socket 30 or the housing 12. In this example, each of the teeth defines a constant radius of curvature measured in a plane passing through the axis A, and similarly each of the cavities defines a constant radius of curvature measured in the same plane. This radius of curvature is preferably greater than 0.5 millimeter, more preferably greater than 1 millimeter, and most preferably substantially equal to 2.5 millimeters. The teeth of the socket 30 each include a respective crest 62, and the teeth of the housing 12 each include a respective crest 82. Once assembled, the crests 62, 82 mechanically interfere with one another to hold the socket 30 in place in the housing 12. Because the crests 62, 82 of the teeth are smoothly curved (without protruding radii of curvature less than 0.5 millimeter), they are relatively immune from frictional damage as the socket 30 is pressed into place in the second recess 16.

Figure 4:
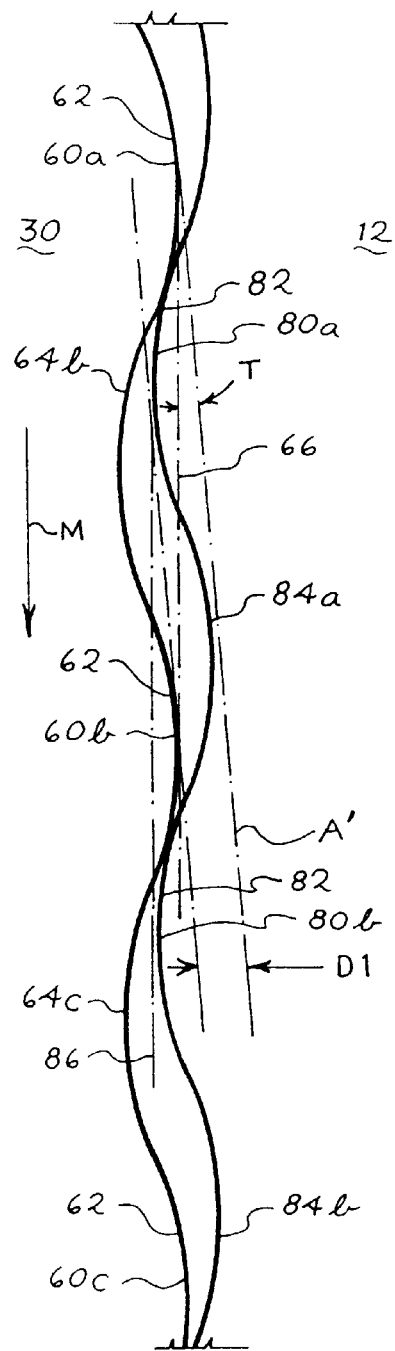
FIG. 4 is a further enlarged schematic view illustrating one preferred configuration for the teeth and cavities of the socket and housing of FIG. 2.

FIG. 4 provides a further enlargement of selected ones of the teeth and cavities. As shown in FIG. 4, each of the teeth 60a, 60b, 60c defines a respective crest 62, and each of the teeth 80a, 80b defines a respective crest 82. The axis A' of FIG. 4 is parallel to the axis A of FIG. 3. A first line 66 is drawn through the crests 62, and a second line 86 is drawn through the crests 82. Note that in this example the lines 66, 86 are parallel, and that both define an angle T with respect to the axis A'. This angle T will be referred to as the taper angle, and the taper angle T is preferably less than 15°, more preferably less than 10°, and most preferably equal to about 6°. In FIG. 4, the distance D1 is the amount of interference between the one of the socket teeth (e.g., tooth 60a) and the respective tooth of the housing 12 (e.g., tooth 80a). Note that the distance D1 is equal to or less than $R_{60a}-R_{60b}$, where $R_{60a}$ is the radius of the crest of the tooth 60a (measured from the axis A), and $R_{60b}$ is the radius of the crest of the tooth 60b, (also measured from the axis A). In other words, the tooth 60b can move past the tooth 80a without mechanically engaging the tooth 80a during assembly.

During assembly, the relative motion between the socket 30 and the housing 12 is such as to move the socket 30 in the direction M relative to the housing 12 (understanding that this can be accomplished by moving the socket 30 in the direction M or by moving the housing 12 in the opposite direction). FIG. 4 shows the socket 30 positioned at the point of initial contact between the teeth 60a, 60b and the teeth 80a, 80b, respectively. The taper angle T is selected with reference to the distance between adjacent crests 62 to insure that there is no interference contact between the crests 62 and the crests 82 as the socket 30 is moved into the recess 16 until the socket 30 is one tooth short of being completely seated in the housing 12. This is the relative position between the socket 30 and the housing 12 that is shown in FIG. 4. Further motion of the socket 30 into the second recess 16 causes the housing 12 to be resiliently deformed outwardly until the teeth 60a, 60b move into and are received by the complementary cavities 84a, 84b, respectively, and the teeth 80a, 80b move into and are received by the complementary cavities 64a, 60b, respectively.

It should be apparent from the foregoing discussion that the toothed outer surface of the socket 30 is tapered between a smaller-diameter portion near the base of this socket and a larger-diameter portion near the top of the socket, and that the toothed surface of the second recess 16 is similarly tapered. With the geometry discussed above in conjunction with FIG. 4, each tooth 60a, 60b, 60c, 60d, 60e of the socket 30 must resiliently expand only a single tooth 80a, 80b, 80c, 80d, 80e, respectively, as the socket 30 is snapped in place in the housing 12. Once the socket 30 is fully seated, all of the teeth engage complementary surfaces on the opposite element to resist disassembly of the socket 30 from the housing 12.

If desired, an adhesive 90 (FIG. 3) can be placed on one or both of the toothed surfaces prior to assembly. This adhesive 90 acts as a lubricant to facilitate the press fit, snap-lock assembly described above. The adhesive provides additional forces tending to hold the socket in place in the housing once assembly has been completed and the adhesive has cured. As an example, an epoxy-based adhesive can optionally be used.

The snap-lock arrangement described above provides many advantages. It allows simple and reliable assembly of the socket to the housing, and in many applications it eliminates the need for sonic welding. Because the crests of the teeth are smoothly curved, and because of the taper angles described above, the teeth are not substantially damaged by friction during assembly.

This arrangement allows dissimilar materials to be used for the housing 12 and the socket 30, and in many examples eliminates the need for compatible materials that can be sonically welded or adhesively bonded. For example, either the housing 12 or the socket 30 can be formed of a suitable polymer, a suitable metal alloy, or another material. In this example, the socket 30 is formed of a polymer such as polyacetal and the housing 12 is formed of a polymer such as glass-filled polyamid. The materials sold by DuPont under the tradenames DELRIN and NYLON have been found suitable.

As another advantage, the geometry described above for the teeth provides an excellent snap-lock fit, even in the face of the inevitable tolerances in the preformed housing and socket. Because the crests of the teeth are smoothly rounded, there are no sharp edges that might be excessively worn under the pressure of assembly. Since multiple teeth engage one another on the socket and the housing (five in this example), the resulting snap-lock provides high-strength joint that requires a high disassembly force to part it. Preferably, the outside diameters of the socket are larger than the corresponding inside diameters of the housing to provide a higher joint strength that requires a higher disassembly force. The result is effectively a permanent interference press fit between the socket and the housing, or a removable fit when adhesive is not used.

Table I provides referred dimensions for one exemplary embodiment of the housing 12 and the socket 30.

TABLE 1

| Tooth of Socket 30 | Maximum distance from axis A (mm) | Axial position parallel to axis A (mm) |
|---|---|---|
| 60a | 28.26 | 4.69 |
| 60b | 27.43 | 8.11 |
| 60c | 26.57 | 11.90 |
| 60d | 25.63 | 15.70 |
| 60e | 24.79 | 19.55 |
| Cavity of Housing 12 | | |
| 84a | 28.30 | 4.69 |
| 84b | 27.42 | 8.11 |
| 84c | 26.07 | 11.90 |
| 84d | 25.04 | 15.70 |
| 84e | 24.23 | 19.55 |

In this example, the teeth and the cavities of the socket 30 and the housing 12 are all provided with a radius of curvature of 2.45 millimeters, each extending over an arc of about 47 degrees and interconnected at their points of tangency. The pitch between adjacent crests is about 3.8 millimeters, measured parallel to the insertion axis A. With this arrangement, a single radius of curvature is used to form each entire surface, including the teeth and cavities of the socket 30 and the teeth and cavities of the housing 12. Alternative configurations are possible, using a radius of curvature greater than about 0.5 millimeter for the crests of the teeth of the socket and the housing. For example, the smoothly curved teeth may be connected to the smoothly curved cavities by a straight line, as shown in the schematic drawing of FIG. 7. The straight line segments are arranged tangent to the respective curves of the teeth and the cavities to provide a smoothly curved surface.

As other alternatives, various approaches can be used to provide the desired degree of resilience during assembly. In the embodiment described above, it is the housing 12 that resiliently deforms radially during assembly. As an alternative, the housing can be provided with slots or cavities that allow portions of the housing to hinge outwardly during assembly, thereby avoiding the need for resilient deformation of the entire housing. Similarly, the socket can be configured to resiliently deform inwardly during assembly. If desired, springs such as coil springs can be used to provide the desired degree of resilience.

Many other alternative implementations are possible. For example, the second recess 16 and the socket 30 can be elliptical, rectangular, circular or otherwise shaped. Furthermore, the teeth do not have to have a constant radius of the curvature, and they may have other smoothly curved shapes, such as elliptical shapes. The teeth do not have to be identical to one another, and it is not essential that the cavities match the teeth in shape.

As other examples, the teeth may extend only partly around the perimeter of the socket and the recess, such that the teeth are only partially annular. As mentioned above, the use of adhesive is optional. As another alternative, the taper angle may be selected such that elastic deformation is required to move a given tooth past two teeth of the opposite element during snap-lock assembly.

FIGS. 8 and 9 relate to a second preferred embodiment of this invention. FIG. 8 shows a fragmentary cross-sectional view of portions of a ball joint housing 100 and a rod 104. Though not shown in FIG. 8, the housing 100 includes a socket for receiving a ball centered at 103. These unillustrated portions of the housing 100 may be identical to the corresponding portions of the embodiment of FIGS. 1–6, or alternatively any other type of ball and any other arrangement for pivotably securing the ball in the housing (with or without a separate socket) can be used.

The housing 100 defines a recess 102 that receives the end of the rod 104. In this embodiment, the rod 104 defines a rod axis 106 that is centered with respect to the rod 104. The rod 104 can be either solid or tubular, and it can be made of any suitable material, including various metals and composite materials, such as glass, carbon fiber or other high-strength fiber composites. Any suitable technology can be used for forming the rod 104, including pultrusion and other methods. Simply by way of example and not limitation, the rod 104 may be 12 mm in diameter.

The housing 100 includes a first surface 110 facing the rod 104, and the rod 104 includes a second surface 112 facing the housing 100. In this embodiment, the first surface 110 is an undulating surface that includes first portions 114 and second portions 116. The first portions 114 diverge from the rod axis 106 with increasing distance from the ball (i.e. proceeding from right to left in the view of FIG. 8). The second portions 116 converge toward the rod axis 106 with increasing distance from the ball. The angles of divergence (for the first portions 114) and convergence (for the second portions 116) are preferably self-locking angles that are most preferably in the range of 3–7° with respect to the rod axis 106. By way of example, the undulating first surface 110 can undulate over multiple cycles, each cycle comprising a respective first portion 114 and a respective second portion 116. Preferably, the first and second portions 114, 116 gradually diverge from and gradually converge toward the rod axis, respectively. As used herein the term "gradually", as used in this context, refers to an angle with respect to the rod axis that is preferably less than 30°, more preferably less than 20°, even more preferably less than 10°, and most preferably in the range of 3–7°. In the illustrated example, the first surface 110 undulates over four cycles with a pitch of 6 mm. Of course, more or fewer cycles can be used, and the pitch can be increased or decreased, as appropriate for the particular application.

In this embodiment, the first and second portions 114, 116 are each generally conical in shape, though other undulating shapes can be used. As best shown in FIG. 9, centering elements 120 are preferably provided in the housing 100 to center the rod 104 with respect to the housing 100. The centering elements 120 can take many forms, and can for example be shaped as guiding ribs extending parallel to the rod axis 106.

In this example, the housing 100 and the rod 104 are formed separately in the illustrated shapes. Then the rod 104 is positioned inside the recess 102, and the space between the rod 104 and the housing 100 is filled with an adhesive 118. Any suitable adhesive can be used, including for example epoxy resin. The centering elements 120 center the rod 104 in the recess 102 prior to the time the adhesive 118 hardens. After the adhesive 118 hardens, the rod 104 is firmly joined to the housing 100 in a manner that resists both compressive loading and tensile loading, i.e. a load on the rod 104 to the right or to the left in the view of FIG. 8. The adhesive adheres to the rod 104 and to the housing 100. The tapered surfaces that taper both to the left and to the right in the view of FIG. 8 form solid wedges that resist both tensile and compressive loads on the rod 104 with respect to the housing 100. Preferably, the adhesive 118 substantially fills the volume between the rod 104 and the housing 100.

Of course, many alternatives are possible. For example, the rod 104 and the recess 102 can be shaped with any desired cross-sectional geometry, including rectangular, circular, elliptical and other shapes. Similarly, the undulating surface may be formed either on the first surface 110 of the housing, the second surface 112 on the rod 104, or both, and the profile of the undulating surface can vary widely. The centering elements 120 can extend along the full depth of the recess 102, or alternatively they can be interrupted.

As used to in the term "ball" is intended broadly to include parts that are partially or completely spherical. Similarly, the term "socket" is intended broadly to encompass sockets that are partially or completely spherical.

The foregoing detailed description has discussed only a few of the many forms that this invention can take. For this reason, this detailed description is intended by way of illustration and not limitation. It is only the following claims, including all equivalents, that are intended to define the scope of this invention.

What is claimed is:

1. A ball joint comprising:

a socket comprising at least two first teeth and at least two first cavities;

a ball received in the socket;

a housing snap-locked to the socket, said housing comprising at least two second teeth received in respective ones of the first cavities and at least two second cavities receiving respective ones of the first teeth;

each of said first and second teeth characterized by a respective smoothly curved crest having a radius of curvature larger than 0.5 millimeter;

said housing further comprising an insertion axis along which the socket is movable into snap-lock engagement with the housing with the first teeth received in the second cavities and the second teeth received in the first cavities;

a first line drawn through the crests of the first teeth diverging from the insertion axis at a first taper angle, and a second line drawn through the crests of the second teeth diverging from the insertion axis at a second taper angle.

2. A ball joint comprising:

a socket comprising a first undulating surface comprising a plurality of first crests;

a ball received in the socket;

a housing snap-locked to the socket, said housing comprising a second undulating surface interlocked with the first undulating surface, said second undulating surface comprising a plurality of second crests;

each of said first and second crests having a radius of curvature greater than 0.5 mm;

said housing further comprising an insertion axis along which the socket is movable into snap-lock engagement with the housing;

a first line drawn through the first crests diverging from the insertion axis at a first taper angle, and a second line drawn through the second crests diverging from the insertion axis at a second taper angle.

3. The invention of claim 1 or 2 wherein the first and second taper angles are substantially equal.

4. The invention of claim 1 or 2 wherein the first and second taper angles are less than 15°.

5. The invention of claim 1 or 2 wherein the first and second taper angles are less than 10°.

6. The invention of claim 1 or 2 wherein the first and second taper angles are in a range between 3° and 6°.

7. The invention of claim 1 or 2 wherein the socket is received in the housing in an interference press fit between a radially outwardly facing portion of the socket and a radially inwardly facing portion of the housing.

8. The invention of claim 1 or 2 wherein the socket and the housing comprise dissimilar materials.

9. The invention of claim 1 or 2 further comprising an adhesive disposed between the socket and the housing.

10. The invention of claim 1 wherein the crests of the teeth are all curved with a single radius of curvature measured in a plane passing through the insertion axis.

11. The invention of claim 1 wherein the cavities are all curved with a single radius of curvature measured in a plane passing through the insertion axis.

12. The invention of claim 1 wherein the teeth and the cavities are all substantially annular.

13. The invention of claim 12 wherein the teeth and the cavities are all rotationally symmetrical about the insertion axis.

14. The invention of claim 1 wherein the at least two first teeth comprise at least four first teeth, and wherein the at least two first cavities comprise at least four first cavities.

15. The invention of claim 14 wherein the at least two second teeth comprise at least four second teeth, and wherein the at least two second cavities comprise at least four second cavities.

16. The invention of claim 1 wherein the taper angles are sufficiently large to ensure that each first tooth mechanically interferes with only a single respective second tooth as the socket is snap-locked to the housing.

17. The invention of claim 2 wherein the first and second undulating surfaces are both curved with a single radius of curvature measured in a plane passing through the insertion axis.

18. The invention of claim 2 wherein the first and second undulating surfaces are each substantially annular.

19. The invention of claim 2 wherein the first and second undulating surfaces are each radially symmetrical about the insertion axis.

20. The invention of claim 2 wherein the first and second undulating surfaces comprise at least four of the first and second crests, respectively.

21. The invention of claim 2 wherein the taper angles are sufficiently large to ensure that each first crest mechanically interferes with only a single respective second crest as the socket is snap-locked to the housing.

* * * * *